(12) United States Patent
Kuhm et al.

(10) Patent No.: US 9,039,339 B2
(45) Date of Patent: May 26, 2015

(54) SPRING NUT

(71) Applicant: TRW Automotive Electronics & Components GmbH, Radolfzell (DE)

(72) Inventors: Michell Kuhm, Ingwiller (FR); Jerome Maurer, Gottenhouse (FR); Jeremy Jacotey, Croissy sur Seine (FR)

(73) Assignee: TRW AUTOMOTIVE ELECTRONICS & COMPONENTS GMBH, Radolfzell (DE)

( * ) Notice: Subject to any disclaimer, the term of this patent is extended or adjusted under 35 U.S.C. 154(b) by 120 days.

(21) Appl. No.: 13/721,682

(22) Filed: Dec. 20, 2012

(65) Prior Publication Data

US 2013/0170923 A1 Jul. 4, 2013

(30) Foreign Application Priority Data

Dec. 29, 2011 (EP) .................................... 11010276

(51) Int. Cl.
*F16B 37/16* (2006.01)
*F16B 37/08* (2006.01)
*F16B 37/14* (2006.01)

(52) U.S. Cl.
CPC ............. *F16B 37/08* (2013.01); *F16B 37/0857* (2013.01); *F16B 37/0842* (2013.01); *F16B 37/14* (2013.01)

(58) Field of Classification Search
CPC ...... F16B 37/08; F16B 37/0842; F16B 37/14; F16B 37/0857

USPC .......... 411/430, 431, 437, 918, 372.5, 372.6, 411/247
IPC ........................................ F16B 37/0842,37/085
See application file for complete search history.

(56) References Cited

U.S. PATENT DOCUMENTS

| | | | |
|---|---|---|---|
| 2,040,383 A * | 5/1936 | Jasper | 174/87 |
| 3,701,373 A * | 10/1972 | Wronke et al. | 411/182 |
| 4,571,136 A * | 2/1986 | Peek | 411/437 |
| 4,756,654 A * | 7/1988 | Clough | 411/437 |
| 4,780,037 A * | 10/1988 | Payne | 411/433 |
| 4,828,444 A | 5/1989 | Oshida | |
| 4,850,778 A * | 7/1989 | Clough et al. | 411/433 |
| 5,291,639 A * | 3/1994 | Baum et al. | 24/297 |
| 5,642,973 A * | 7/1997 | Pretty | 411/431 |
| 5,810,532 A * | 9/1998 | Huang | 411/431 |
| 6,135,691 A * | 10/2000 | Nadarajah et al. | 411/431 |
| 6,238,158 B1 * | 5/2001 | Clements | 411/431 |
| 2008/0181748 A1 * | 7/2008 | Rosemann et al. | 411/431 |

FOREIGN PATENT DOCUMENTS

| | | |
|---|---|---|
| DE | 3728070 | 3/1988 |
| DE | 19733771 | 6/1999 |
| EP | 1621782 | 2/2006 |

\* cited by examiner

*Primary Examiner* — Gary Estremsky
(74) *Attorney, Agent, or Firm* — Tarolli, Sundheim, Covell & Tummino LLP

(57) ABSTRACT

In a spring nut (10) for attachment onto a stud (12), having a substantially oblong seat for the stud (12), the seat having an axial insertion opening (32) for the stud (12) and a holding section for the stud (12), provision is made that the spring nut (10) completely encloses the seat on a front wall (28) opposite the insertion opening (32) and in the peripheral direction.

7 Claims, 2 Drawing Sheets

SPRING NUT

BACKGROUND OF THE INVENTION

The present invention relates to a spring nut for attachment onto a stud, including a substantially oblong seat for the stud, the seat having an axial insertion opening for the stud and a holding section for the stud.

Spring nuts of this type are used for fastening a component, such as, e.g., an interior lining part, to a second component such as, e.g., a vehicle body part. To this end, the body part is provided with a stud to allow the spring nut to be slid thereon and secured thereto. The component to be attached has an opening by which it is first slid over the stud, and then the spring nut is slid onto the stud and pressed against the second component, which is thereby fixed in place on the stud. Such a spring nut is disclosed in DE 197 33 771 C1, for example.

One disadvantage of the spring nuts known so far is that they can be used for one particular stud size only. Also, the length of the stud needs to be precisely adjusted to the component to be attached or to the spring nut in order to prevent the stud from protruding on the rear side of the spring nut, which is undesirable.

SUMMARY OF THE INVENTION

The object of the invention is to provide a spring nut of the type initially mentioned, which covers the stud completely.

To achieve the object, provision is made for a spring nut for attachment onto a stud, including a substantially oblong seat for the stud, the seat having an axial insertion opening for the stud and a holding section for the stud. According to the invention, the spring nut completely encloses the seat on a front wall opposite the insertion opening and in the peripheral direction. The stud is thereby completely covered on the rear side, so that it is reliably protected from any inadvertent contact. The seat is designed to have a length such that the stud is enclosed therein over its entire length.

The spring nut is intended to reliably enclose the stud also in the case of different stud diameters or lengths. To ensure this, the spring nut includes a cylindrical outer wall that is closed in the peripheral direction, and an inner wall that encloses the seat on the front face and partly in the peripheral direction. The outer wall predefines the shape of the spring nut in particular in the peripheral direction so that, irrespective of the size of the stud, a uniform appearance of the spring nut is provided. The inner wall serves for an adjustment to the particular stud size and can yield resiliently, preferably in the peripheral direction, and in this way can adapt to the diameter of the stud.

To allow a flexible adjustment to the respective stud size, the inner wall preferably includes at least two radially resilient shackles which extend in the longitudinal direction of the cylinder and are arranged to be uniformly distributed in particular in the peripheral direction.

Owing to their radial resilience, these shackles can perfectly adapt to the diameter of respective stud. In addition, due to the provision in the peripheral direction of the outer wall which is closed in the peripheral direction, the inner wall can also adapt in such a way that free spaces exist between the spring shackles. The free spaces are covered in the peripheral direction by the closed outer wall.

For supporting the resilient shackles, a web is provided preferably on the front face, the web furthermore terminating the seat on the front face. The resilient shackles include a front face end resiliently mounted at this web and a free end facing the insertion opening. This allows the spring shackles to adapt in an ideal manner.

Spring nuts of this type are preferably manufactured from plastic in an injection molding process. In order to reduce the manufacturing expenditure, it is desirable that such a spring nut can be manufactured in a mold without a slide. To this end, it is required that the spring nut does not have any undercuts. This is attained in that the holding section as well as the web and the inner wall do not overlap in the longitudinal direction of the cylinder. In this case, the outer wall preferably has the shape of a cylinder. The mold halves of such an injection mold can be moved toward each other in the direction of the longitudinal axis of the cylinder, the mold halves being provided with projections which mold the seat, for example. Since the holding sections and the webs and the inner wall do not overlap, they can be fabricated without any difficulty because no undercuts are present within the spring nut in the longitudinal direction.

The holding section preferably includes locking members which are configured to be resilient in the radial direction, so that they can adapt to different stud sizes or stud diameters.

The locking members may, for example, be arranged opposite each other in pairs in the longitudinal direction, so that they can lock in place at the stud or at teeth provided on the stud.

With the assembly completed, it is frequently desirable that the spring nut can also be released again for the purpose of exchanging a component. In order to ensure this, the locking members are arranged offset in the longitudinal direction, for example, and, in a way, constitute an internal thread. In this embodiment, the stud is provided with a corresponding thread or with corresponding projections which constitute a thread. Since the locking members are adapted to yield resiliently, the spring nut can be placed onto the stud without a rotational motion, which allows a simple assembly of the spring nut. For disassembly, on the other hand, the spring nut is simply screwed off the stud.

BRIEF DESCRIPTION OF THE DRAWINGS

Further advantages and features will become apparent from the description below in conjunction with the accompanying drawings, in which.

DESCRIPTION OF EXEMPLARY EMBODIMENT

Figure 1:
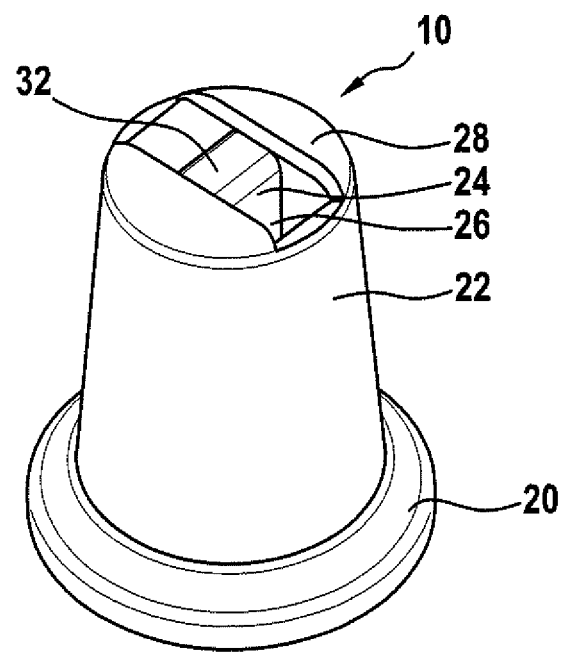
FIG. 1 shows a perspective view of a spring nut according to the invention.

FIG. 1 illustrates a spring nut 10 for attachment onto a stud 12. Such a spring nut 10 may be used for attaching a first component 14, such as a lining part for a vehicle interior, to a second component 16, such as a vehicle body (see FIG. 2). The stud 12 is in this case firmly fitted to the second component 16, for example welded thereto. The first component 14 has an opening 18 by which it is fitted over the stud 12, and subsequently the spring nut 10 is slid onto the stud 12 and secured thereto. Thereby, the first component 14 is pressed against the second component 16 by means of the spring nut 10 and is securely held on it.

Figure 2:
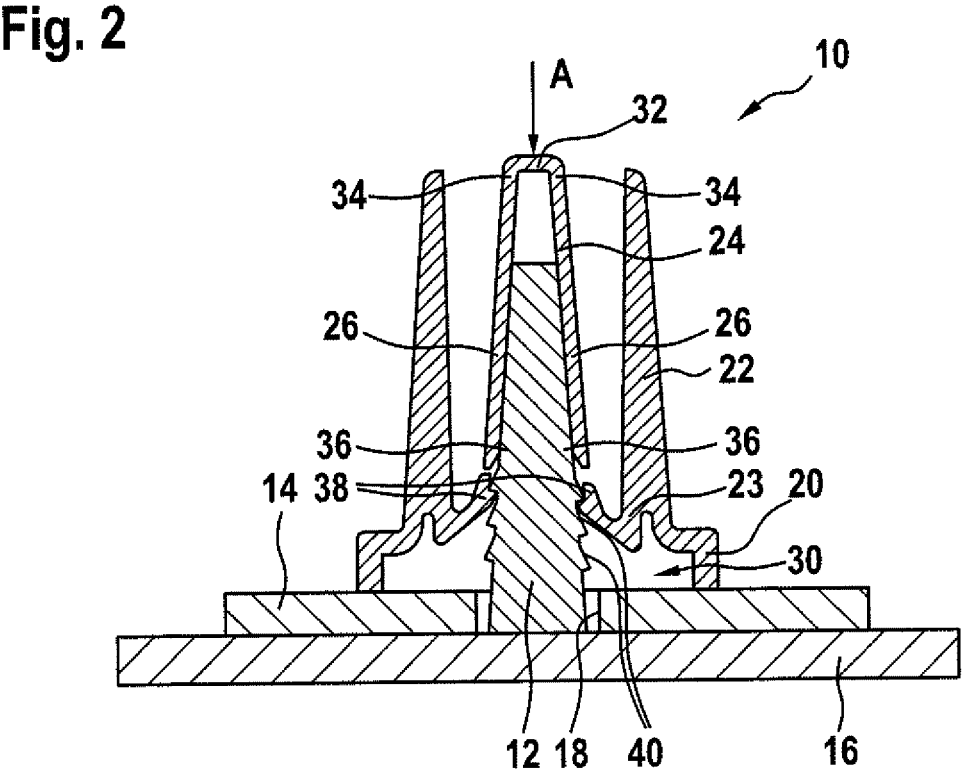
FIG. 2 shows a sectional view of the spring nut from FIG. 1.

As can be seen in FIGS. 1 and 2, the spring nut 10 has an annular contact region 20 by which the spring nut 10 rests against the first component 14 and which has an insertion opening 30 provided thereon for the stud 12. The contact region 20 transitions into a substantially cylindrically shaped outer wall 22 which is of a substantially cylindrical design, with the front faces of this cylinder being designed to be open. A holding section 23 which serves for fixing the stud 12 in place is provided on the inside of the outer wall 22, adjoining the contact region 20.

The spring nut 10 further includes an inner wall 24 which, as will be discussed below, is formed by a plurality of resilient shackles 26. Provided on a front wall 28, which is located opposite an insertion opening 30 for the stud 12, there is a web 32 on which the spring shackles 26 are resiliently held by a front face end 34. A free end 36 of each spring shackle 26 points towards the insertion opening 30 and is configured to be resilient in the radial direction.

As is apparent from FIG. 2, the holding section has a plurality of locking members 38 provided thereon, which are likewise configured to be resilient in the radial direction. The stud 12 includes projections 40 which correspond to the locking members 38 and by which the stud 12 can lock in place on the holding section 23 of the spring nut 10.

For attaching the first component 14, the spring nut 10 can be pushed onto the stud 12 in the axial direction A and locked in place thereon by means of the locking members 38. Since both the spring shackles 26 and the locking members 38 are configured to yield in the radial direction, the spring nut 10 is adjustable to various sizes or diameters of the stud 12. In the peripheral direction, the stud is completely covered by the outer wall 22 and at least partly by the spring shackles 26. In the axial direction, the stud is completely covered by the web 32 on the front wall 28. In the assembled condition shown in FIG. 2, the stud 12 is thus completely enclosed by the spring nut 10.

As can be seen in particular in FIG. 2, the spring shackles 26 and the locking members 38 do not overlap in the axial direction A. This has the advantage that the spring nut 10 can be manufactured using a simple injection molding die without a slide. In order to allow this, the web 32 is furthermore arranged offset by 90 degrees in relation to the two locking members 38 and the spring shackles 26, so that the latter do not overlap each other, either.

The number of the spring shackles 26 and/or of the locking members 38 as well as the arrangement of the web 32 may be adapted to the respective requirements as desired. It should only be made sure that they do not overlap in the axial direction A, in order to ensure a simple manufacture of the spring nut 10.

As is shown in particular in FIG. 2, the locking members 38 are arranged offset in the axial direction A. Thereby, in a way, they form an internal thread. The projections 40 of the stud 12 constitute an outer thread corresponding thereto. This allows the spring nut 10 to be slid onto the stud in the axial direction A, the locking members 38 then being locked in place on the stud. But, for a more precise adjustment of the distance of the spring nut 10 from the second component 16, it is also possible to screw the spring nut 10 onto the thread of the stud 12. In addition, this thread allows a simple disassembly of the spring nut 10 since the latter can be screwed off the stud 12 in a simple manner. Any damage to the locking members 38 during the disassembly of the spring nut 10 is thus ruled out.

Figure 3:
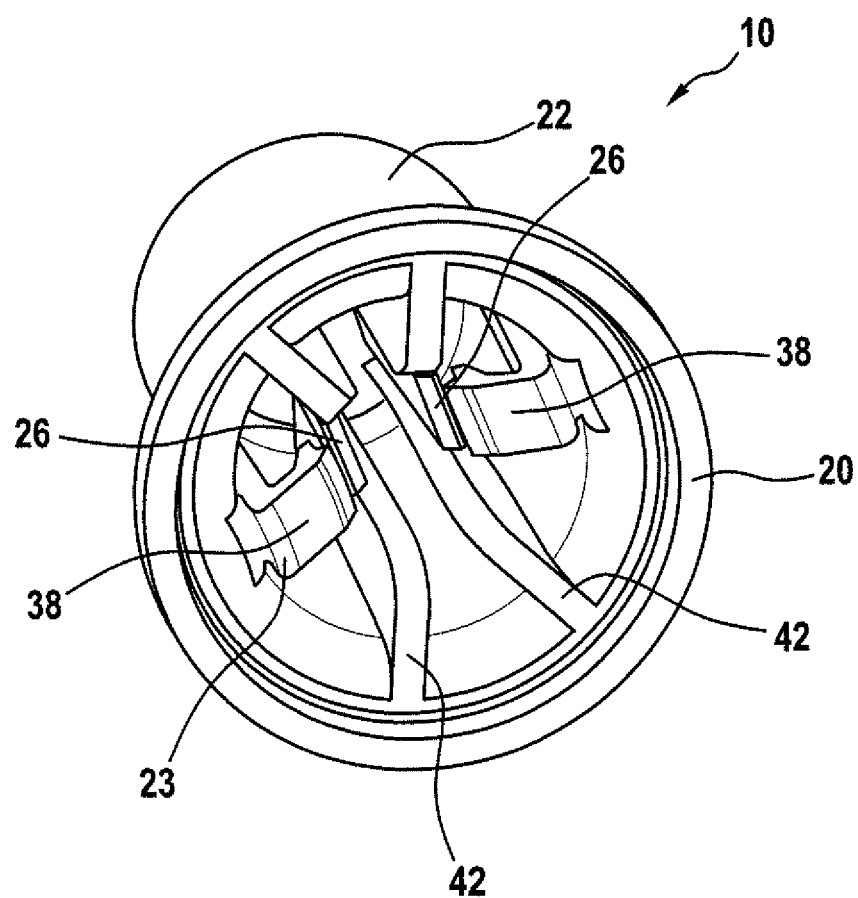
FIG. 3 shows a second perspective view of the spring nut from FIG. 1.

As can be seen in FIG. 3, additional stiffening ribs 42 are provided on the inside of the outer wall 22 to provide the outer wall 22 with an additional stability, so that a deformation of the outer wall 22 is prevented. Such a compression of the outer wall 22 might result in the spring shackles 26 being unable to yield in the radial direction.

The invention claimed is:

1. A spring nut for attachment onto a stud comprising:
a holding section for retaining the stud,
a base with an axial insertion opening through which the stud can extend,
an inner wall including at least two radially resilient shackles which extend in an axial direction of the spring nut and are uniformly distributed in a peripheral direction of the spring nut, the inner wall extending in the axial direction of the spring nut, the inner wall being enclosed on a front face opposite the axial insertion opening,
a web provided on the front face, the resilient shackles having an end resiliently mounted at the web and a free end facing the insertion opening, and
an outer wall extending in the axial direction of the spring nut that encloses the inner wall in the peripheral direction of the spring nut.

2. The spring nut according to claim 1, wherein the holding section includes locking members which are resilient in a radial direction.

3. The spring nut according to claim 2, wherein the locking members are arranged opposite each other in pairs in the axial direction.

4. The spring nut according to claim 2, wherein the locking members are offset in the longitudinal direction and constitute an internal thread.

5. The spring nut according to claim 1, wherein the outer wall is spaced apart from the inner wall in a radial direction.

6. The spring nut according to claim 1, wherein the outer wall and the inner wall share a common longitudinal axis.

7. The spring nut according to claim 1, wherein the holding section does not overlap the web and the inner wall in the axial direction of the spring nut.

* * * * *